United States Patent [19]
Hale, Sr.

[11] 3,738,610
[45] June 12, 1973

[54] SEAL ASSEMBLY FOR GOGGLE VALVES
[75] Inventor: Elden A. Hale, Sr., Pittsburgh, Pa.
[73] Assignee: Koppers Company Inc., Pittsburgh, Pa.
[22] Filed: Aug. 5, 1971
[21] Appl. No.: 169,262

[52] U.S. Cl. ............................................. 251/167
[51] Int. Cl. ........................................... F16k 25/00
[58] Field of Search .................. 138/94.5; 251/167, 251/168

[56] References Cited
UNITED STATES PATENTS
3,171,442  3/1965  Carr .............................. 138/94.5
1,812,069  6/1931  Westling ....................... 251/302 X
3,266,525  8/1966  Wolter ........................... 251/174 X Primary Examiner—Henry T. Klinksiek
Attorney—Boyce C. Dent, Oscar B. Brumback and Olin E. Williams

[57] ABSTRACT

An improved seal assembly for goggle valves of the type including valve bodies connected to the ends of adjoining gas mains with a planar opening between the bodies normal to the flow of gas in the mains and a two-position valve closure in the opening for closing the mains against the flow of gas when the closure is in one position and opening the mains when it is in the other position. The seal assembly includes an inner rigid primary seal and an outer flexible secondary seal between both valve bodies and the portion of the valve closure in the planar opening to prevent the escape of gas between the valve bodies and the valve closure. Preferably, the rigid seal comprises abutting planar sealing surfaces between the valve closure and valve bodies and the flexible seal comprises flexible sealing surfaces, such as silicone rubber, on the valve closure abutting rigid non-planar sealing surfaces on the valve bodies.

6 Claims, 3 Drawing Figures

Patented June 12, 1973

INVENTOR.
ELDEN A. HALE, SR.

BY Boyce C. Dent

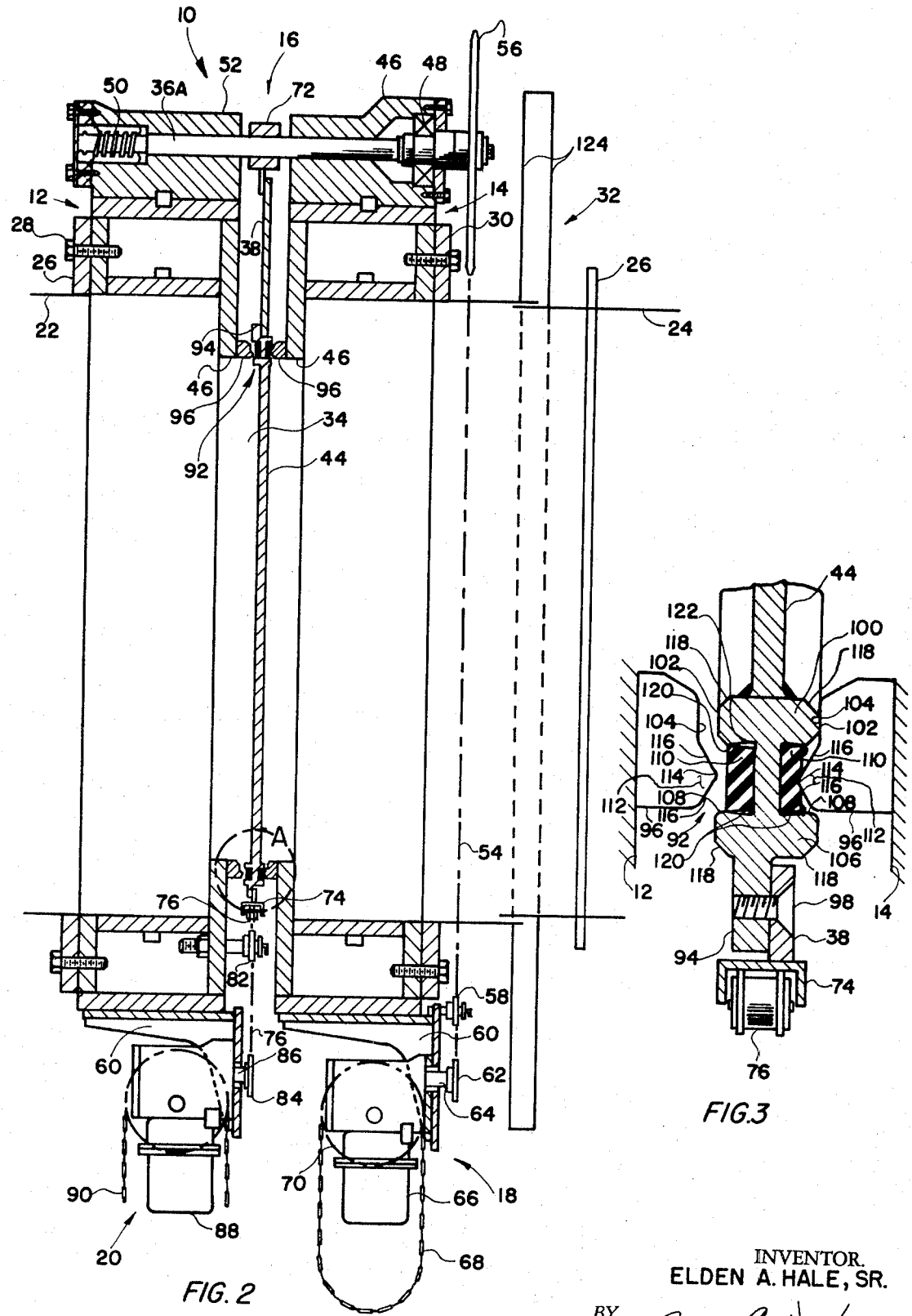

SEAL ASSEMBLY FOR GOGGLE VALVES

BACKGROUND OF THE INVENTION

1. Field of the Invention:

The invention relates generally to valves and valve actuation and more particularly to a pivoted bifaced valve.

2. Description of the Prior Art:

A goggle valve is used to shut off the flow of gas in a gas main or duct. They are especially necessary in ducts carrying toxic or explosive gases such as generated by blast furnaces, open hearths, or basic oxygen furnaces in steel mills. Since workmen must sometimes work within or near the gas mains, no gas must pass beyond the valve.

A conventional goggle valve generally consists of two valve bodies secured to adjoining ends of a pair of aligned mains, a valve closure, and a clamping mechanism for clamping the valve bodies to the valve closure. The valve bodies have an opening in them approximately the same size as the gas main to permit passage of gas through the valve. The valve closure has two operating positions, "open" and "closed." In the "closed" position, a solid disc is placed which is larger than the opening in the valve body. A similar disc is placed in the "open" position but has an opening therein approximately the same size as the opening in the valve bodies. Thus, when the valve closure is pivoted so that the portion including the disc is aligned with the mains, the flow of gas through the mains is closed and when the open portion is pivoted into aligment with the mains, gas flows through the valve.

A clamping mechanism, such as a jackscrew, may be used to clamp the valve bodies against the valve closure when it is in operating position. To close the goggle valve, the two valve bodies are spread axially apart by the clamping mechanism and the valve closure is pivoted between them to the position where the disc is aligned with the mains and then the bodies are clamped against the valve closure. The valve bodies and the valve closure have parallel machined surfaces which are abutted upon clamping of the valve bodies to provide a tight seal. When the valve is closed, gas is unable to pass through the valve since the disc is larger than the opening in the valve. If the valve leaks, it must leak to the outside of the valve and not into the downstream main. To open the valve, the valve bodies are spread apart and the "closed" portion is pivoted out of the opening between the valve bodies and the "open" portion of the valve closure is pivoted between the valve bodies. The bodies are then reclamped and gas is free to pass through the valve.

Since both the "open" and "closed" portions of the valve closure are attached to a single holder, it is apparent that only one portion can be clamped between the valve bodies at one time while the other is exposed to atmosphere where it usually becomes contaminated with dirt and oxide scale. When the contaminated portion is pivoted into position and the valve bodies clamped against it, the metal to metal seal between the bodies and the closure may not provide a gas tight seal because of the poor condition of the sealing surfaces. However, the valve bodies can be clamped tightly against the valve closure and the seal is usually considered satisfactory when it is "bubble" tight; that is, when a film of soapy liquid placed around the seal exhibits only small bubbles caused by leaking gas. In most installations, the valve is in a remote location and a small amount of leakage to atmosphere can be tolerated. However, when the valve is in a congested area, leaking gas is a problem and an absolute seal to atmosphere is desirable.

Some attempts have been made to improve the seal between the valve bodies and the valve closure by using flexible packing between them. An example of this type seal is shown in U.S. Pat. No. 3,425,662 which uses a rather complex arrangement of spring biased sliding valve seats with multiple flexible packing elements.

SUMMARY OF THE INVENTION

Accordingly, an object of the present invention is to provide an improved seal assembly for goggle valves of simple construction and few moving parts utilizing the advantages of flexible sealing material for positive sealing against the leakage of gas from within the mains to atmosphere between the valve bodies and valve closure.

This is generally accomplished by providing a primary rigid inner seal and a secondary flexible outer seal beween both the "open" and "closed" portions of the valve closure and the valve bodies clamped against the portion of the closure in alignment with the valve bodies.

More particularly, the inner seal comprises rigid planar surfaces on both sides of both portions of the valve closure abutting similar surfaces on the valve bodies. The outer seal comprises flexible or resilient planar surfaces on both sides of both portions of the valve closure abutting non-planar surfaces on the valve bodies; such non-planar surfaces projecting into the flexible surfaces when the valve bodies are clamped against the closure. The non-planar surfaces are arranged to urge the valve bodies apart during pivoting of the valve closure to prevent damage to the flexible seal surfaces. This arrangement does not require the use of precisely machined slidable sealing surfaces, biasing springs, multiple flexible seals, and the like and the number of moving parts is minimized.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike:

FIG. 2 is a sectional view of the valve of FIG. 1 in side elevation; and

FIG. 3 is an enlarged view of the portion of the seal assembly within the circle designated A in FIG. 2 showing the construction of the seal assembly with the seals on one side of the valve closure being shown in the disengaged position and the other side showing the seals in the engaged position.

DESCRIPTION OF THE PREFERRED EMBODIMENT

Figure 1:
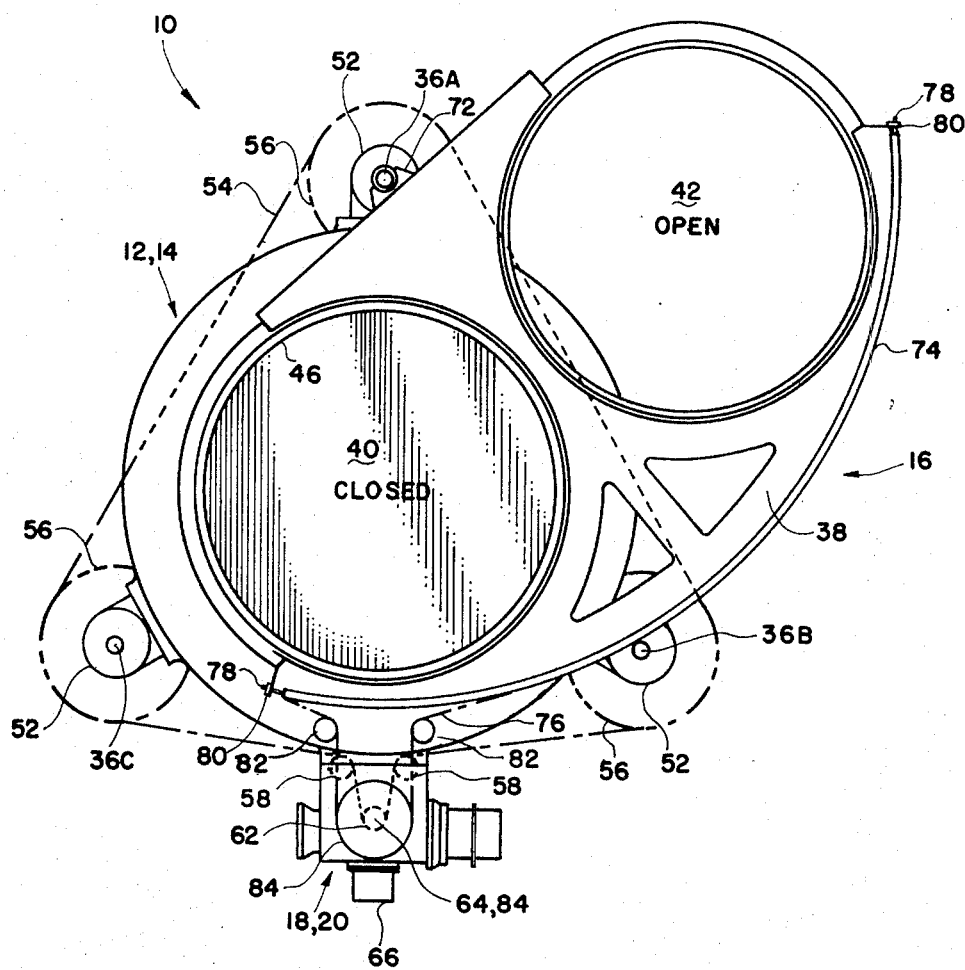
FIG. 1 is a schematic illustration of a goggle valve viewed coaxially with the gas mains showing the arrangement for spreading the valve bodies and for pivoting the valve closure from a closed to an open position.

The goggle valve generally designated by the numeral 10 is best illustrated in FIGS. 1 and 2. Generally, the valve includes a pair of valve bodies 12 and 14, a valve closure 16, a valve body spreading mechanism 18, and a valve closure pivoting mechanism 20. The valve bodies 12 and 14 are secured to adjoining ends of generally aligned gas mains 22 and 24. As shown in FIG. 2, the valve body 12 on the left is rigidly secured to a flange portion 26 of the gas main 22 by bolts 28. The valve body on the right is similarly secured to a flange portion 30 of an expansion joint 32 which is secured to the other gas main 24. The expansion joint 32 is conventional and accommodates axial movement of the valve body 14 when the bodies 12 and 14 are spread apart to permit pivoting of the valve closure 16 to another position.

The valve bodies 12 and 14 are spaced apart as shown in FIG. 2 to define a planar opening 34 therebetween normal to the flow of gas and are connected by three jackscrews 36A, 36B, and 36C. The valve closure 16 is pivotable about the top jack-screw 36A from a "closed" position, as illustrated in FIG. 1, to an "open" position with the "closed" portion moved to the left. The valve closure 16 includes a holder 38 to which is secured a "closed" portion 40 shown in alignment with the gas mains in FIG. 1 and an "open" portion 42 out of alignment with the gas mains 22, 24. The closed portion 40 includes a sloid disc 44 of larger diameter than the opening 46 through the valve bodies 12, 14 so that when the "closed" portion of the closure 16 is aligned with the mains 22, 24, gas is not permitted to flow through the valve 10. The "open" portion 42 of the closure 16 is similar to the "closed" portion 40 except that it does not include a disc 44 so that when this portion is aligned with the gas mains 22, 24, gas is permitted to flow through the valve 10. Both the "open" and "closed" portions 40, 42 of the closure 16 includes seals for engagement with the valve bodies 12, 14 when the respective portions 40, 42 are in alignment therewith as will be later explained.

The mechanism 18 for clamping and unclamping (spreading) the valve bodies 12, 14 includes the aforementioned jackscrews 36 which axially connect the valve bodies. Each screw 36 is mounted for rotation in a bearing holder 46 on the valve body 14 and is restrained by a bearing 48 in holder 46 against axial movement. The other end of the jackscrew 36 includes threads 50 threaded into mating threads in a similar holder 52 on the other valve body 12. Thus, it can be seen that as the jackscrews 36 are rotated, the threads 50 on the screws 36 and in the holders 52 will cause the valve body 14 to move away from the other valve body 12.

The jackscrews 36 are rotated by movement of a chain 54 encircling a sprocket 56 mounted on the end of each jackscrew 36 adjacent the bearing 48. As best shown in the lower portion of FIG. 1, the chain 54 is looped around a pair of idler sprockets 58 rotatably mounted on a bracket 60 attached to the bottom of the valve body 14. The chain 54 is also looped around a drive sprocket 62 mounted on the end of an output shaft 64 of a gear motor 66 also secured to the same bracket 60. Thus, when the motor 66 is energized, the chain 54 is rotated by the drive sprocket 62 and thereby rotates the jackscrews 36 to move the valve body 14 away from the other valve body 12. To clamp the valve bodies 12, 14 against the valve closure 16, the motor 66 is merely energized to rotate in the opposite direction so that the jackscrews 36 are also rotated in the opposite direction to move the valve body 14 towards the other valve body 12 until it seats against the valve closure 16 which slides along jackscrews 36 until it abuts valve body 12. Although the jackscrews 36 are preferably rotated by a gear motor 66, if desired, a gear box manually operated by a chain may be used (not shown). The gear motor 66 is preferably provided with a chain 68 surrounding an input sprocket 70 on the gear motor 66 for manual rotation of the jackscrews 36 in the event of motor failure.

The valve closure 16 is hung on the top jackscrew 36A by a bracket 72 surrounding the jackscrew between the valve bodies 12, 14 and is free to pivot thereabout. The holder 38 also includes a channel 74 secured to the bottom segment of the holder 38. A conventional roller chain 76 is nested in the channel 74 and is secured at each end thereof by a take-up screw 78 extending through a post 80 fastened to the end of the holder segment. A portion of the chain 76 is looped around a pair of idler pulleys 82 rotatably mounted to the valve body 12. The chain 76 is also looped around a drive sprocket 84 mounted to the output shaft 86 of a gear motor 88. Thus, when the motor 88 is energized, the drive sprocket 84 causes the chain 76 to move relative to the idler sprockets 82 thereby carrying the valve closure 16 with it to pivot the closure from an "open" to a "closed" position or vice versa. The gear motor 88 is similar to the gear motor 66 used to clamp and unclamp the valve bodies 12, 14 and is similarly operated, including manual operation by a chain 90 if desired.

The "open" and "closed" portions 40, 42 of the valve closure 16 each include a seal assembly 92 as best illustrated in FIG. 3. Generally, each seal assembly 92 includes a ring 94 secured to the holder 38 which abuts a sealing seat ring 96 on each valve body 12, 14. The ring 94 is preferably secured to the holder 38 by screws 98 and includes an inner peripherial flange 100 extending axially from both sides of the ring 94. The flange 100 includes planar sealing surfaces 102 which engage similar planar sealing surfaces 104 on sealing seat ring 96 secured to each valve body 12, 14 (seat ring 96 is not cross-hatched in FIG. 3 for the sake of clarity). Another axially extending flange 106 on the ring 94 defines a groove 108 on both sides of the ring 94 in which a ring 110 of flexible sealing material is secured. The portion of rings 96 facing the flexible seal rings 110 preferably include raised annular beads 112 having an apex 114 with sides 116 sloping towards the planar surface 104 of the rings 96. When the valve bodies 12, 14 are clamped against the valve closure 16, these beads 112 project into the yielding flexible sealing rings 110 thereby providng a secondary gas-tight seal therewith.

The raised annular beads 112 on rings 96 are preferred since they provide a larger area of contact with the flexible rings 110 than would a flat abutting surface. Nevertheless, flat abutting surfaces (not shown) can be used if desired.

The flanges 100 and 106 on the ring 94 include chamfers 118 along their outside edges so that as the valve closure 16 is pivoted about the jackscrew 36A, the chamfers 118 will ride up along the sloping surfaces 116 of the annular beads 114 and thereby force the valve bodies 12, 14 apart. This avoids damage to the flexible sealing rings 110.

The flanges 100, 106 on the ring 94 preferably include sloping surfaces 120 on the sides next to the flexible sealing rings 110 forming keystone shaped grooves 108 in which the rings 110 are retained. Thus, the flexible sealing rings 110 are easily replaced when they become worn or damaged by merely pivoting the appropriate portion of the valve closure 16 out of engagement with the valve bodies 12, 14 and pulling the rings out of the grooves. Thereafter, new sealing rings can be easily inserted in the grooves 108. If desired, grooves 108 may have straight sides and a conventional adhesive may be used between the sealing rings and the grooves to secure the rings therein.

The flexible sealing rings 110 can be made from either a compressible substance such as sponge rubber or plastic or from a non-compressible substance such as solid rubber. Preferably, the material is made from solid silicone rubber since it is heat resistant to the extent necessary and resists attack from most chemicals likely to be present in the gas.

In the event that the sealing material is made from a non-compressible substance, then a relief should be provided to receive the material displaced by the projection of the raised annular beads 112 into the yielding material. This is preferably accomplihsed by making the base of the groove 108 wider than the base of ring 110 to form a keystone shaped groove as mentioned above. By using a ring 110 of rectangular cross-section, the material displaced by the projection of beads 112 into the ring 110 can flow into the open areas 122 on the sides of the groove 108. The ring 110 may also bubble up slightly around the beads 112 as shown on the right side of FIG. 3. A suitable adhesive can be used to secure the base of the rings 110 to the base of the grooves 108.

If desired, grooves 108 may be formed with straight instead of sloping sides and a relief area (not shown) approximately the same cross-section as, and a mirror image of, the beads 112 can be formed in the base of the flexible ring 110. Thus, the material displaced by the beads 112 can fill this relief.

OPERATION

Assuming that the valve closure 16 is positioned with the "open" portion 42 in alignment with the gas mains 22, 24 with the "closed" portion 40 pivoted out of engagement, the "closed" portion 40 may be placed into operation by first unclamping the valve bodies 12, 14, pivoting the valve closure 16 to the desired position, with the "open" portion 42 to the right as shown in FIG. 1, and reclamping the valve bodies. The valve bodies 12, 14 are unclamped by energizing the gear motor 66 to rotate in the appropriate direction which will rotate the jackscrews 36 by means of the chain 54. The valve body 12 being rigidly fixed to the gas main 22, will remain stationary and the other valve body 14 will move axially away from the valve body 12, its axial movement being accommodated by the flexible diaphragm portion 124 of the expansion joint 32. Thereafter, the gear motor 88 is energized to pivot the valve closure 16 to the position desired by means of the chain 76. When this position is reached, the motor 66 is energized to rotate in the opposite direction to rotate the jack-screws 36 in the opposite direction to move the valve body 14 into clamping position against the seal assembly 92 on the valve closure 16. The same procedure is used to again put the "open" portion 42 of the valve closure 16 in alignment with the gas mains 22, 24 to permit the flow of gas through the valve 10. When the valve closure 16 is pivoted, the sides 116 of the annular beads 112 engage the chamfers 118 on the flanges 100, 106 and urge the valve closure 16 to a central position between the valve bodies 12, 14 if it has not already moved to that position. This avoids damage to the flexible sealing rings 110 as they slide past the annular beads 112 on the rings 96.

Thus, it can be seen that the present invention successfully makes use of both a rigid primary seal towards the inner or gas side of the valve closure and a flexible secondary seal on the outer or atmosphere side of the valve closure. The construction is simple and rugged and uses a minimum of moving parts; the flexible sealing material is easily replaceable when worn or damaged.

Accordingly, the invention having been shown in its best embodiment and mode of operation, that which is desired to be claimed by Letters Patent is:

I claim:

1. An improved seal assembly for goggle valves of the type including:

valve bodies connected to the ends of adjoining gas mains and defining a planar opening therebetween normal to the flow of gas in said mains;

a valve closure having an open portion and a closed portion movable into said planar opening for opening and closing said mains to the flow of gas therein, both of said open and closed portions adapted for sealing engagement with said valve bodies when positioned in said planar opening;

said valve bodies being movable towards the portion of said closure in said opening for clamping engagement therewith, the improvement comprising:

an inner circumferential rigid sealing means on said open and closed portions of said closure for primary sealing engagement with corresponding circumferential sealing seats on said valve bodies; and an outer circumferential flexible sealing means on said open and closed portions of said closure for secondary sealing engagement with said sealing seats including circumferential rings of resilient sealing material extending axially from the sides of said open and closed portions of said valve closure towards said sealing seats on said valve bodies, said rings including yielding planar sealing surfaces engageable with corresponding surfaces on said sealing seats when said valve bodies are moved into clamping engagement with said valve closure, said sealing seats on said valve bodies including raised annular beads projecting into said yielding planar sealing surfaces of said rings when said valve bodies are moved into clamping engagement with said valve closure, for preventing the escape of gas in said mains between said valve bodies and said valve closure.

2. The seal assembly of claim 1 wherein said rings of resilient sealing material are retained in circumferential grooves defined by inner and outer ring flanges, said flanges including chamfers engageable with said annular beads for urging said valve bodies axially apart during movement of said valve closure in said planar opening to prevent damage to said rings of resilient sealing material.

3. The seal assembly of claim 2 wherein the sides of said inner and outer ring flanges defining said grooves are sloped towards each other from said valve closure thereby forming keystone grooves for retaining said rings of resilient sealing material.

4. The seal assembly of claim 2 in which said rings of resilient sealing material are secured by adhesive between said rings and said grooves.

5. The seal assembly of claim 1 wherein said rings of resilient seal material are made from deformable sealing material and said circumferential grooves include relief areas for receiving the material displaced by the projection of said beads into said rings.

6. The seal assembly of claim 1 wherein said raised beads include two sides sloping from an apex toward a planar surface on said sealing seats, said sides projecting into said rings of resilient sealing material thereby providing an enlarged sealing contact area therebetween.

* * * * *